(No Model.)
L. J. PURDY.
PATTERN TRACER.
No. 267,106. Patented Nov. 7, 1882.
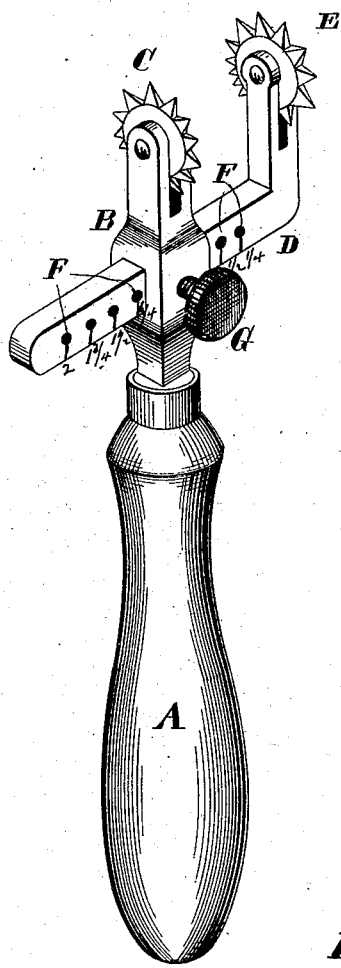
Attest:
Charles Pickles
William S. Sayers
Inventor:
Louise J. Purdy
By Knight Bros
Attys

UNITED STATES PATENT OFFICE.

LOUISE J. PURDY, OF ST. LOUIS, MISSOURI.

PATTERN-TRACER.

SPECIFICATION forming part of Letters Patent No. 267,106, dated November 7, 1882.

Application filed June 15, 1882. (No model.)

*To all whom it may concern:*

Be it known that I, LOUISE J. PURDY, of the city of St. Louis, in the State of Missouri, have invented a certain new and useful Improvement in Pattern-Tracers, of which the following is a full, clear, and exact description, reference being had to the accompanying drawing, forming part of this specification, which is a perspective view.

The object of my invention is to furnish a tracing-wheel with two star-markers—one for following the pattern-line and the other for making a simultaneous mark any desired distance therefrom for a cutting-line; and my invention consists in securing this second star-wheel adjustably to the stem of the first by means of a right-angle arm and a set-screw.

A represents the handle of the instrument, and B a stem secured therein.

In the end of the stem B is journaled a star-wheel, C.

The body of the stem is formed with an opening to receive one end of a right-angle arm, D, in the other end of which is journaled a star wheel or marker, E.

Holes F are made in the end of the arm that passes through the stem, which receive the lower end of a set-screw, G, working in the stem. Thus the relative positions of the wheels can be easily changed, as desired, for a narrow or broader seam.

I have shown the end of the arm that passes through the stem graduated, so that the exact distance the wheels are apart may be known.

I claim as my invention—

The combination of handle A, stem B, wheel C, arm D, wheel E, and set-screw G, all constructed substantially as and for the purpose set forth.

LOUISE J. PURDY.

Witnesses:
 SAML. KNIGHT,
 GEO. H. KNIGHT.